United States Patent [19]

Lapp, Jr.

[11] 4,263,649

[45] Apr. 21, 1981

[54] COMPUTER SYSTEM WITH TWO BUSSES

[75] Inventor: William H. Lapp, Jr., Mohawk, N.Y.

[73] Assignee: Mohawk Data Sciences Corp., Parsippany, N.J.

[21] Appl. No.: 1,253

[22] Filed: Jan. 5, 1979

[51] Int. Cl.³ .................... G06F 15/16; G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,909,790 | 9/1975 | Shapiro et al. | 364/200 |
| 3,932,841 | 1/1976 | Deerfield et al. | 364/200 |
| 3,938,098 | 2/1976 | Garlic | 364/200 |
| 3,959,775 | 5/1976 | Valassis et al. | 364/200 |
| 3,967,246 | 6/1976 | House | 364/200 |
| 3,999,163 | 12/1976 | Levy et al. | 364/200 |
| 4,016,541 | 4/1977 | Delagi et al. | 364/200 |
| 4,035,777 | 7/1977 | Moreton | 364/200 |
| 4,038,644 | 6/1977 | Duke et al. | 364/900 |
| 4,040,028 | 8/1977 | Pauker et al. | 364/200 |
| 4,041,472 | 8/1977 | Shah et al. | 364/900 |
| 4,086,626 | 4/1978 | Chung | 364/200 |
| 4,096,571 | 6/1978 | Vander Mey | 364/200 |

Primary Examiner—Mark E. Nusbaum
Attorney, Agent, or Firm—Robert R. Hubbard

[57] ABSTRACT

A computer system having two busses which are shared by one or more processors, one or more memories, one or more input/output channels and a bus control mechanism. One of the busses is used for the transmission of original messages from the processors and/or I/O channels to the memories or the bus control mechanism. The other bus is used for the transmission of reply messages by the memories or the bus control mechanism to the senders of original messages requiring a reply. The bus control mechanism includes a first control means for controlling priority and usage of the first bus and a second control means, independent of the first control means, for controlling reply message traffic over the second bus. The reply message control means is arranged to handle reply message traffic on a priority basis and a time availability basis so as to prevent hang up of the reply message bus.

8 Claims, 8 Drawing Figures

COMPUTER SYSTEM WITH TWO BUSSES

BACKGROUND OF INVENTION

This invention relates generally to data processing systems and more particularly to a computer system in which a number of units, including input/output (I/O) devices, one or more processors and a memory, communicate with one another over a common electrical bus.

Many contemporary computer system products have been designed to operate with a common electrical bus architecture in which all units connected with the bus send and receive messages, including address, data and control information, by means of a single set of signals. Such a system can be easily updated or enhanced as improved units, such as memory, I/O devices, processors and the like, become available, thereby increasing the useful life of the product. Such an enhancement can be made with a minor design effort involving an interface of the improved unit to the common bus. That is, the entire computer product, including hardware and software does not have to be redesigned to take advantage of improved performance characteristics of advanced memories, I/O devices, processors and the like.

In such common bus systems a unit generally obtains control of the bus by means of a bus request and bus grant procedure controlled by a bus control mechanism according to a prearranged priority scheme. Upon obtaining control, a unit is permitted to communicate with another unit by means of a set of fixed messages called bus commands. For example, an I/O device having data to be stored in the memory, upon obtaining use of the bus, sends a message directed to the memory consisting of the data, the address where it is to be stored and a memory write command. The memory upon sensing the command and, provided it is not busy with a prior request, captures the data and address information from the bus and performs the memory write operation. This memory write command is exemplary of a number of commands or messages which are unidirectional in nature and generally can be transmitted or completed in one transfer cycle of the bus such that the bus can thereafter be used by any of the system units for other communications.

Another group of commands or messages in such common bus systems are bidirectional in nature in that one unit sends a message (requesting message) to another unit requesting the other unit to answer back with a reply message at a later time. Exemplary of this type of message are memory read operations, call interrupt operations and the like. For example, in a memory read operation, an I/O device or a processor sends during a first bus transfer cycle a message consisting of a memory read command and a memory address. The memory interprets the command as a request for data to be read from memory at the received address and then returned to the sending unit. One way of handling this situation is to allow the sender to retain control of the bus until the memory has read and returned the data to the sender. This procedure is, however, unsatisfactory because a typical memory cycle is generally much longer than a bus transfer cycle such that the bus could be hung up (dedicated) with the memory read operation for a number of bus transfer cycles.

One solution to the hangup problem is to require the sender of the message to include therein its identity or bus address. This allows the memory to capture the memory address and the user's address, perform the required data read operation and return the data during a later bus transfer cycle to the original sender by using the saved sender address. The bus can therefore be free to handle other communications during the intervening time. Although this solution, which is exemplified in a system disclosed in U.S. Pat. No. 3,993,981 improves the system throughput, there is further room for improvement as the bulk of the communications on the common bus consist of messages requesting a reply and the corresponding reply messages.

In prior art arrangements, reply messages tend to be returned in the same time sequence in which the original requesting messages were transmitted. Such an arrangement is described in U.S. Pat. No. 4,015,246 in which the reply messages for read memory commands are returned over a set of data leads, separate and independent from another set which is devoted to original message traffic. This alleviates the original message bus hangup problem discussed above but does so at the expense of hanging up the reply bus (until the reply is transmitted). Moreover, the reply bus is dedicated to a single type of message traffic (memory to processor) and is therefore rather inflexible.

BRIEF SUMMARY OF INVENTION

Briefly, the present invention is embodied in a computer system having two common busses which are coupled to a plurality of units including one or more processors, one or more input/output channels and one or more other units. The processor and/or input/output channel units include means to transmit during separate bus intervals original messages via one of the busses to different ones of the other units. These other units include means to return reply messages during later bus transfer intervals over the other bus with transmission of all such messages being under the control of a bus control mechanism. The improvement of this invention is characterized by the bus control mechanism including first means to control the original message traffic over the first bus and including second means to control the time sequence of the reply message transmission in accordance with the availability in time of the reply messages and the priority of two or more reply messages competing for the same bus transfer interval. The original message control means and the reply message control means are independent of one another so that the second bus is not hung up awaiting the return of any single reply message. In a preferred form of the invention the other units include at least one memory unit and a bus control unit which in turn includes the bus control mechanism.

BRIEF DESCRIPTION OF THE DRAWING

In the accompanying drawings like reference characters denote like elements of structure, and.

DESCRIPTION OF PREFERRED EMBODIMENT

Figure 1:
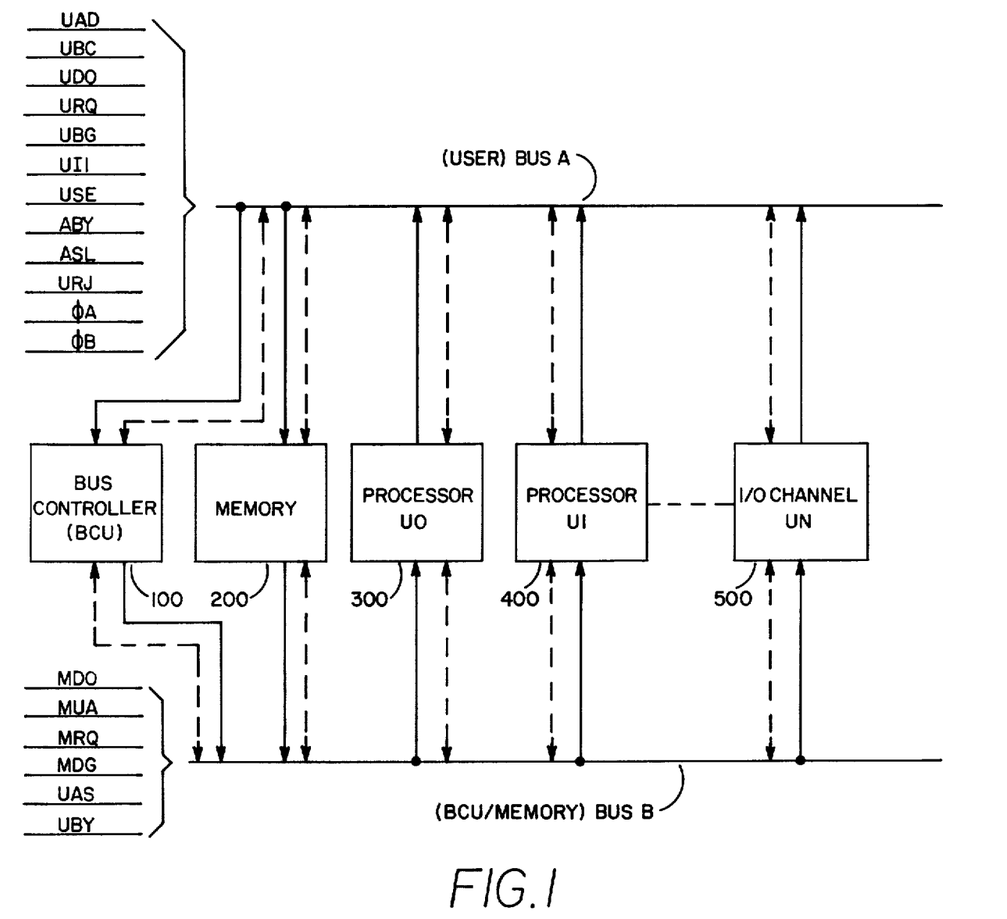
FIG. 1 is a block diagram of a computer system embodying the present invention.

An illustrative computer system embodying the present invention is shown in FIG. 1 to include two common busses, Bus A (user) and Bus B (BCU/Memory). The two busses are shared by a number of units including a bus controller (BCU) 100, a memory 200, and a plurality of user devices U0, U1 and UN designated by reference numbers 300, 400 and 500, respectively. In this illustrative system the numeral N is an integer and the dashed line between units U1 and UN indicate that other user units (not shown) may be included in the system. The user units U0 and U1 are shown to be processor units and the user unit UN is an I/O channel to which may be connected a host of I/O devices. Also, although one memory 200 is illustrated, the system may include other memories of the same or different memory cycle times.

The various units communicate with one another over the two busses with a predetermined set of messages under the control of BCU 100. The set of messages include various commands such as Start User, Halt User, Ack Start User, Nack Start User, Write Memory, Read Memory, Post Interrupt and Call Interrupt. The BCU controls the message traffic by establishing bus cycles for both busses by continually transmitting on Bus A the system clock signals $\phi A$ and $\phi B$ and controlling the priority of usage of each bus by all units (including itself). A typical message, such as Write Memory, is initiated by a user requesting a bus cycle. The sending user does this by applying a user request signal (URQ) to a unique one of N URQ signal leads on Bus A (unique to the sending user). The BCU grants bus usage depending on the priority of the sending user with respect to any other pending bus request from other users or the BCU itself. Assuming grant of bus usage, the BCU applies a user bus grant signal (UBG) to a unique one of N UBG signal leads on Bus A (the one which is unique to the sending user). This UBG signal enables the sending user to transmit the write memory message onto Bus A. This message include a memory address on the UAD (user address) signal leads, a write memory identification codes on the UBC (user bus command) leads, and the data to be stored on the UDO (user data out) leads. The memory 200 interprets the signals on the UBC and UAD leads as selecting it and places an attachment select signal (ASL) on the bus to signal the sender that the message is being looked at. If not busy, the memory traps the information on the UBG, UAD and UDO leads and performs the write-/-memory operation. If busy, the memory places a busy signal (ABY) on Bus A to signal the sender of such event.

The above-described mode of transmitting messages applies to all messages which are sent by a user to another user, to memory or to the BCU. For the case where a message requests the receiving unit to return a reply at a later time, certain restrictions are placed on the direction of data flow on Bus A and the additional Bus B is provided to handle the transmission of the reply message in accordance with one aspect of this invention. This allows Bus A, once the original message has been sent during one bus cycle, to be free to handle other messages without being hung up either during the later bus cycle (or cycles) when the reply message is being sent or during any intervening bus cycles.

The restrictions on the data flow direction for Bus A are shown by the arrows on the solid connections between the various units and Bus A. Thus, the user units are permitted to transmit (but not to receive) data to Bus A. The BCU and the memory are permitted to receive (but not to transmit) data from Bus A. The arrows at both ends of the dashed connections between the unit and Bus A indicate that all of the units can transmit or receive control information to or from Bus A.

One example of a message requesting reply is a read memory in which a user requests the memory to read data at a certain address and to return the read data. Another example is a message unique to a particular design in which interrupt information is posted in the BCU by one of the units. The BCU upon such posting provides a control signal UI1 to Bus A signifying that an interrupt is pending and that an available CPU should request the interrupt. When it becomes available, a processor unit transmits a Call Interrupt message which essentially requests the BCU to return the interrupt information during a later bus cycle.

In accordance with this invention, these reply messages are returned from the BCU or the memory, as the case may be, when they become available over Bus B to the requesting sender under control of the BCU. Thus, the arrow heads on the solid connections between the units and Bus B indicate that the BCU and the memory are permitted to transmit (but not to receive) data to Bus B and the user units are permitted to receive (but not to transmit) data from Bus B. Again, the arrows at both ends of the dashed connections between Bus B and the various units indicate that the flow of control information is in both directions.

At the time the requesting sender transmits the original message over Bus A, its address is placed on the signal leads USE of Bus A. The receiving unit, for example the memory 200, traps and saves this address for the later transmission of a reply message over Bus B. Until the reply message is ready for transmission, Bus B is free for other reply message traffic. When the reply message is ready for transmission, the memory places a bus request signal MRQ on an associated MRQ lead contained in Bus B. In general, systems embodying this invention can have more than one memory and there is one MRQ lead for each such memory. The BCU grants bus usage dependent upon the priority of the particular bus request signal with respect to other bus requests from other memories or from the BCU itself. Assuming grant of the bus, the BCU places a bus grant signal MDG on the MDG lead of Bus B which corresponds to memory 200. The MDG signal enables the memory 200 to transmit the reply message over Bus B. At this time the memory places the data on the MDO leads and the address of the original sender on the MUA leads of Bus B. The BCU decodes the signals from the MUA leads and places a signal on that one of N UAS leads which is unique to the original sender. The UAS signal enables the original sender to trap the reply message.

As an aid to this description, the signal leads of Bus A and Bus B are summarized as follows:

| Bus | Leads | Function |
| --- | --- | --- |
| A | UAD | User Address for Passing:<br>1. Memory address, user to memory<br>2. Interrupt control information, user to BCU |
| A | UBC | User Bus Command, defines the message |
| A | UDO | User Data Output, datapath for a write to memory message, device status on post interrupt |
| A | URQ | User Request, N lines, one for each user, BCU prioritizes to determine bus usage |
| A | UBG | User Bus Grant, N lines, one for each user, transmitted by the BCU to select the user gaining access to the present bus cycle |
| A | UI1 | User Interrupt, single line signifying the presence of an interrupt pending in the BCU |
| A | $\phi$A | User System Clock, primary system clock |
| A | $\phi$B | User Clock, secondary system clock out of phase with clock $\phi$A |
| A | USE | User Select Encoded, these lines identify the address of the sending user for those messages requesting a reply |
| A | ABY | Memory Busy, a unit activiates this line when it is busy and cannot accept the message. The sender should retry the bus request |
| A | ASL | Attachment Select. A user activates this line upon detecting that it is a receiver of a message |
| A | URj | User Reject, activated by a user when the message is rejected |
| B | MDO | Memory Data Out, transmission of data from memory or BCU to a user |
| B | MUA | Memory User Address, to provide user address from the memory to the BCU |
| B | MRQ | Bus B Request, N lines, a memory (or the BCU) activates one of these lines unique to it when ready to send a reply message |
| B | MDG | Bus B Data Grant, BCU when priortizing the MRQ line activates one of these lines for the winning memory controller |
| B | UAS | User Address, N lines, one for each user signifying the presence of data on the MDO lines for the selected user, these lines are a decode of MUA by the BCU |
| B | UBY | User Busy, this line enables a user to signal the memory or the BCU if it is unable to capture the data on the MDO lines |

Figure 2:
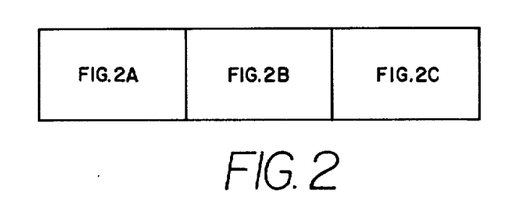
FIG. 2 is a composite view illustrating the manner in which FIGS. 2A, 2B and 2C should be arranged for viewing.
Figure 2A:
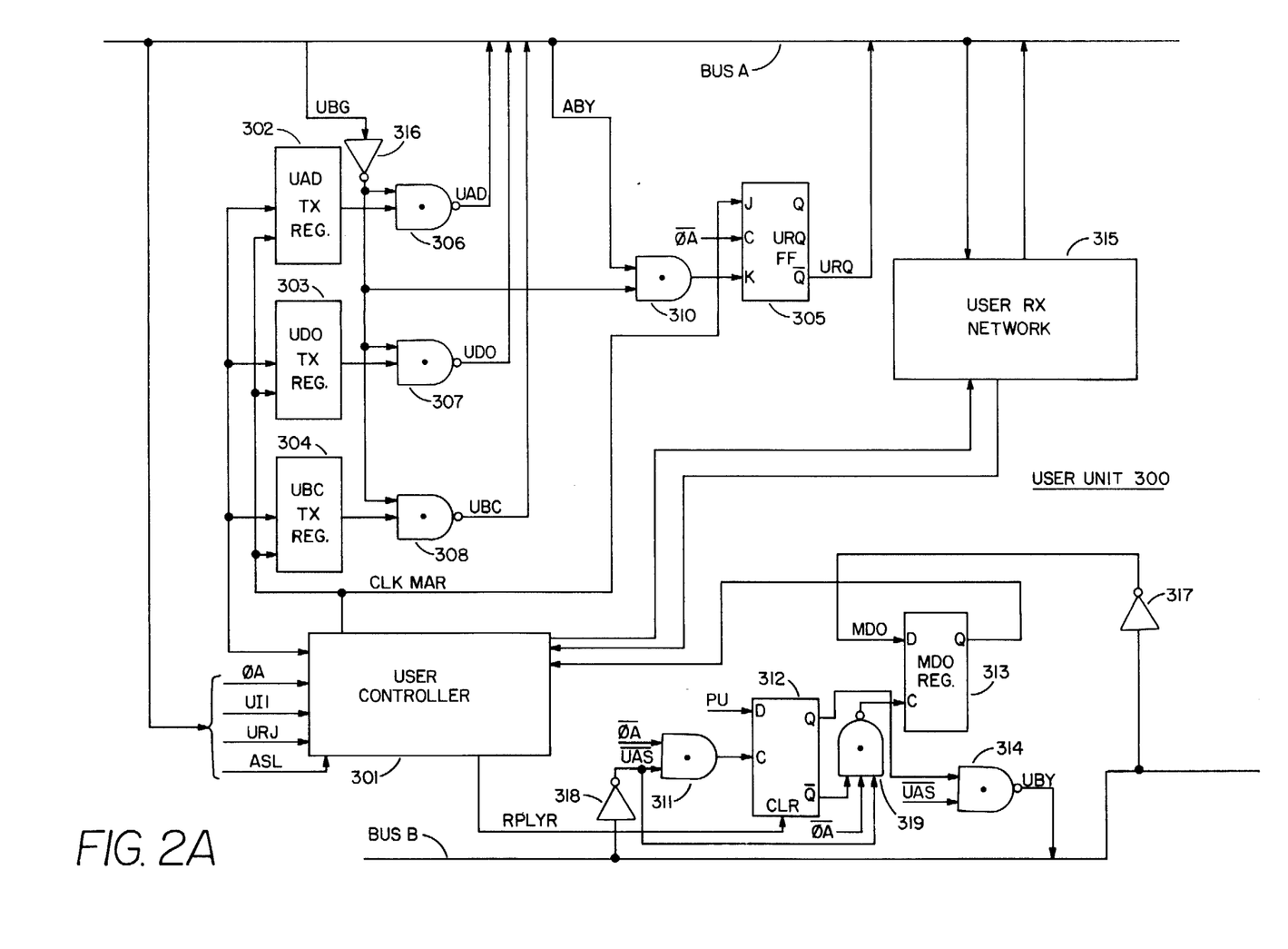
FIGS. 2A, 2B and 2C are block diagrams illustrating in some detail a user unit, a bus controller unit and a memory, respectively, of a preferred embodiment of the invention.
Figure 2B:
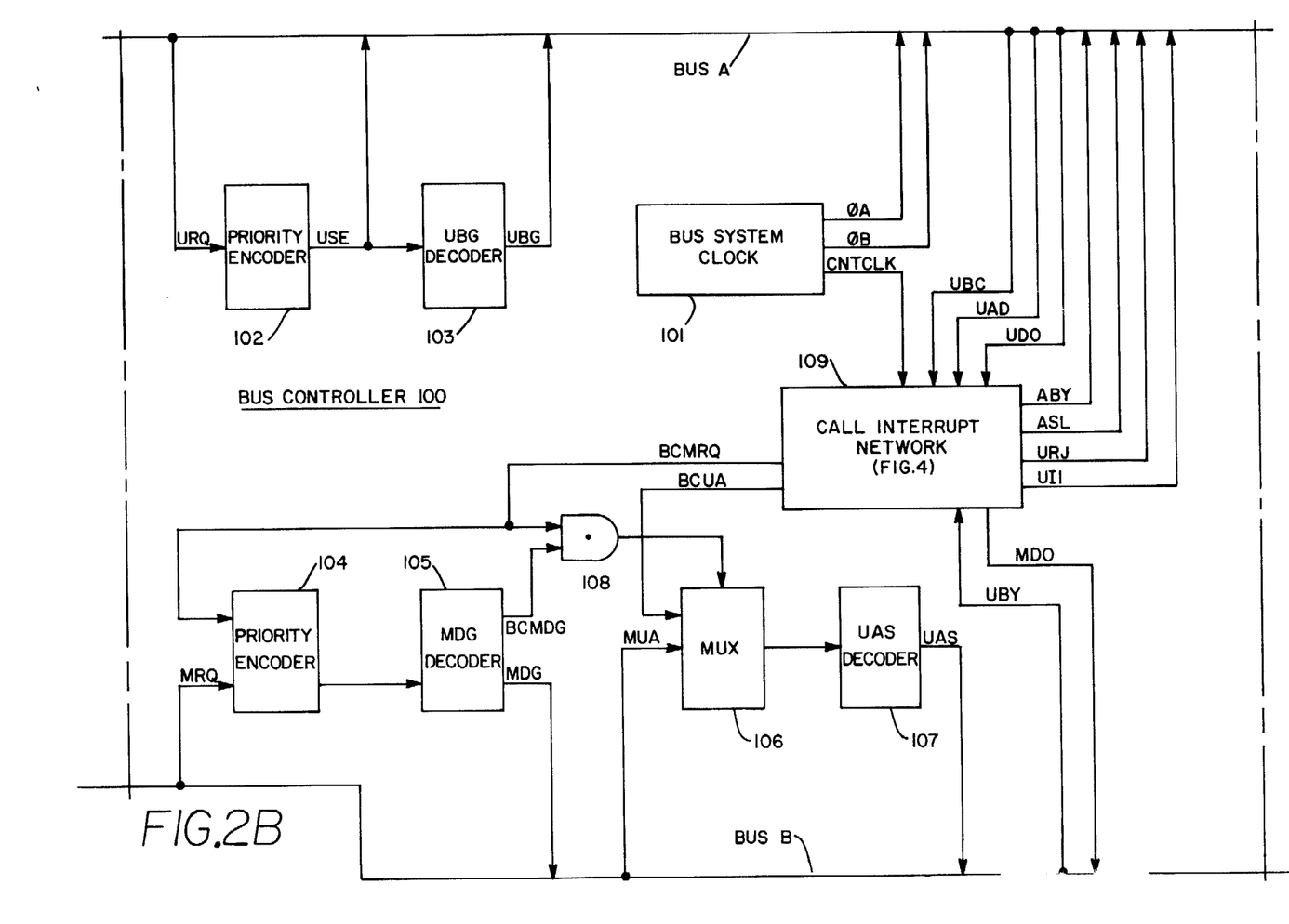
Figure 2C:
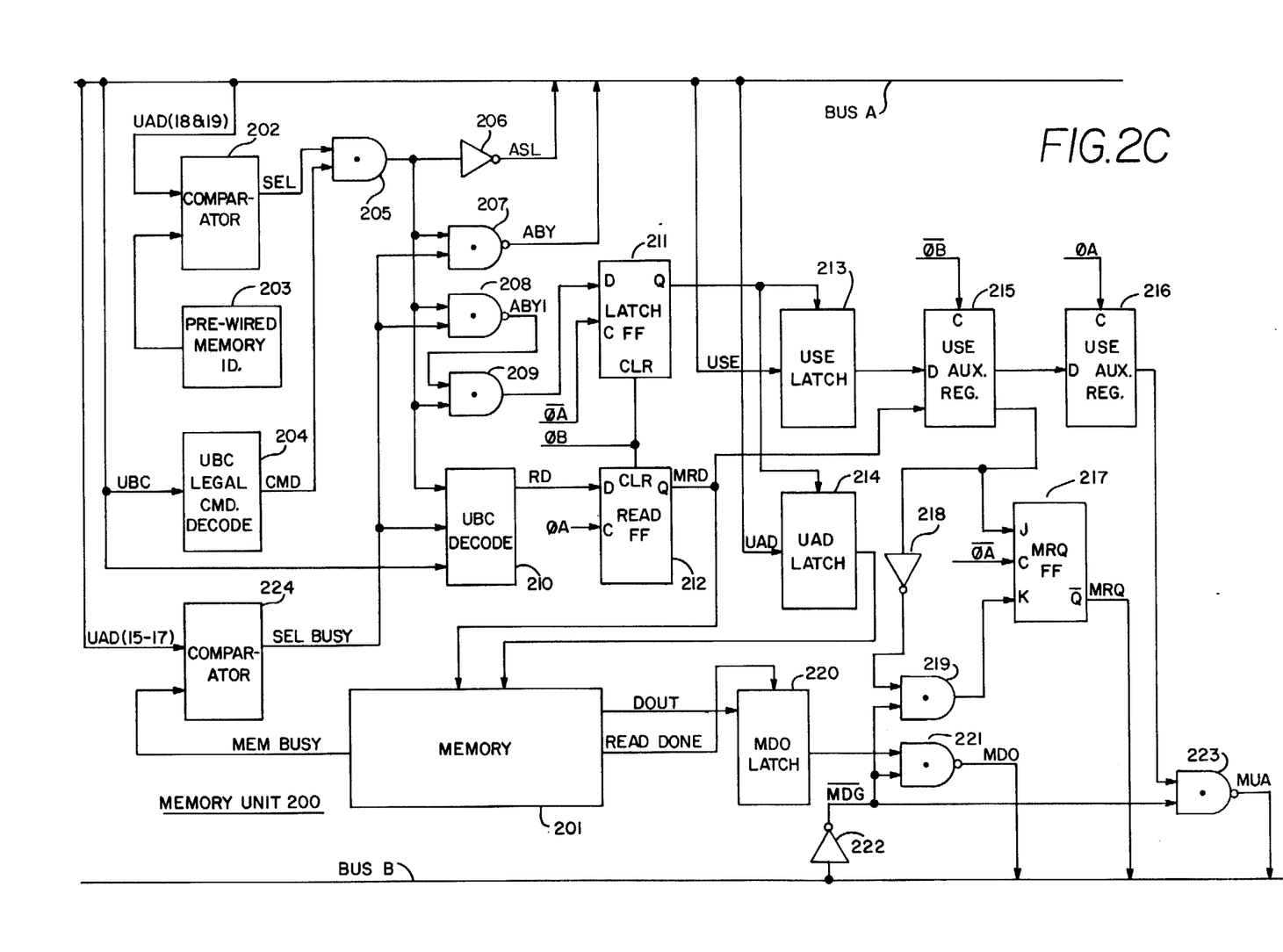

With reference now to FIGS. 2A, 2B and 2C which should be arranged according to the composite of FIG. 2, a particular design embodying the invention will be described. This description will focus upon two different original messages which require a reply message to be returned at a later time. First, the description will focus specifically on the case of a read memory message which is originally transmitted on Bus A by processor user unit 300 to memory unit 200, the reply message being returned over Bus B at a later time, all under the control of the BCU 100. Secondly, the description will focus on a call interrupt message from the processor user unit to the BCU over Bus A and a reply message over Bus B at a later time. The BCU 100 is illustrated in FIG. 2B between the two broken lines, the processor user unit 300 in FIG. 2A and a memory unit 200 in FIG. 2C.

Figure 3:
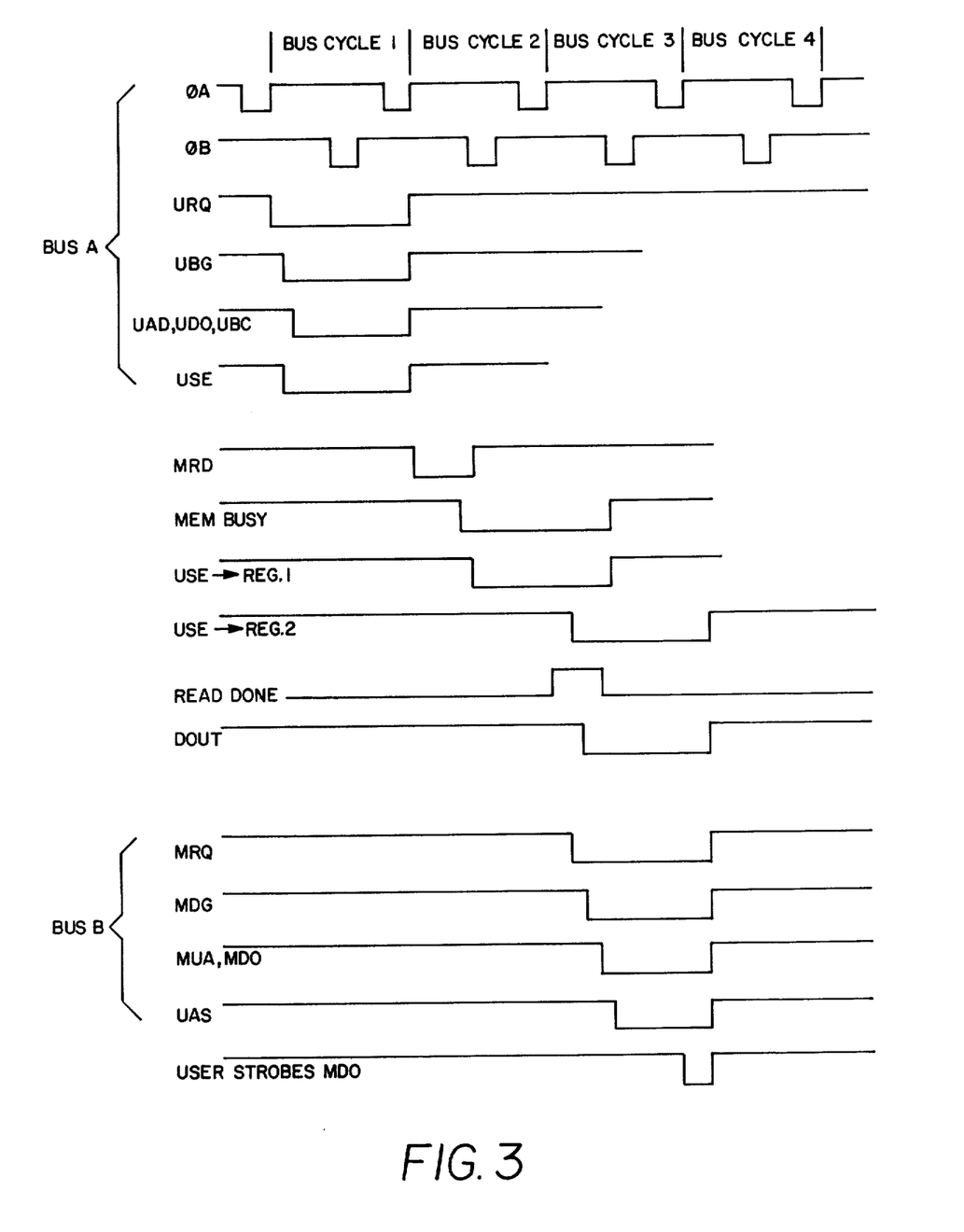
FIG. 3 is a wave form diagram of signals which occur at various points in the block diagrams of FIGS. 2A, 2B and 2C.

With reference initially to FIG. 2B, the BCU includes a system clock 101 which produces over Bus A the bus cycle timing signals $\phi$A and $\phi$B. The wave forms for these and other signals appearing in FIGS. 2A, 2B and 2C are shown in FIG. 3 to which reference will also be made in the following description. As illustrated in FIG. 3, a bus cycle is defined as one cycle of the $\phi$A timing signal. The system clock also produces a counter clock signal CNT CLK which is used in a call interrupt network 109. Generally, Bus A or Bus B is capable of handling one byte of data (on lines UDO or MDO) during a single bus cycle. To the extent a message contains more than one byte is transmitted in several bus cycles, one per byte. Thus, a message transmission time interval may consist of one or more bus cycles.

To initiate a read message, the user unit 300 must first make a bus request. To do this, the user unit includes a user controller 301 (FIG. 2A) which produces a CLKMAR signal which loads UAD, UDO and UBC information (also provided by controller 301) into UAD, UDO and UBC transmit (Tx) registers 302, 303 and 304. The CLKMAR signal also enables the J input of the URQ flip-flop 305. On the next trailing edge of the bus cycle clock $\phi$A, flip-flop 305 switches and places a URQ signal on Bus A. This URQ signal is shown as becoming active during bus cycle 1 in FIG. 3 wave form diagram. The user controller for the processor user 300 essentially is the processor itself and for the case of a microprocessor, the CLKMAR signal and the UAD, UBC and UDO information may be individual bits of the microcode.

The active URQ signal is applied from Bus A to a priority encoder 102 (FIG. 2B) included in the BCU 100. The priority encoder 102 compares the active URQ signal with other URQ signals associated with other users for priority according to a predetermined scheme. Assuming that user 300 has priority, the output of priority encoder 102 produces the user address code USE of user 300 and applies such code to Bus A. Additionally, the output of priority encoder 102 is decoded in a UBG decoder 103 and applied as a bus grant signal to the UBG signal lead on Bus A associated with user unit 300.

In user unit 300 the UBG signal is inverted by inverter 316 and enables gating networks 306, 307 and 308 to pass the UAD, UDO, UBC information onto Bus A. The wave forms for the signals URQ, UBG, USE are shown in the FIG. 3 wave form diagram together with a signal, identified as UAD, UDO and UBC, which signifies the time during bus cycle 1 that this information is active on Bus A. It will be noted on the wave form diagram that the leading edges of UBG, USE, UAD, UDO and UBC signals are delayed slightly from the leading edge of the URQ signal due to signal propogation delays through the priority encoder 102, the UBG decoder 103 and the coincidence gates 306, 307 and 308.

The memory unit 200 (FIG. 2C) includes a comparator 202 which compares a portion of the UAD signals (bits 18 and 19 for one design) with a previewed memory identification code provided from a prewired network 203. Upon a compare, the comparator generates a signal SEL, signifying the recognition that the message is directed to the memory. A decoder 204 receives the UBC signals from Bus A and produces an output signal CMD if the UBC message is legal (i.e., is a member of the set which the memory is designed to receive). An AND gate 205 responds to the coincidence of the SEL and CMD signals to apply a signal to an inverter 206, coincidence gates 207, 208 and 209 and to a decoder 210. Inverter 206 drives Bus A with the ASL signal which signals the user controller 301 in FIG. 2A that the message is being looked at. Gates 207 and 208 produce active outputs if the memory unit is busy. To this end a comparator 224 compares a portion of the UAD signals (bits 15 to 17 in the illustrated design) with a set of MEM BUSY leads provided by memory 201, there being a busy lead for each memory segment contained in memory 201. If there is a busy condition, comparator 224 produces a signal SEL BUSY which causes gate 207 to drive Bus A with a busy signal ABY and gate 208 to inhibit a gate 209 which in turn essentially inhibits the memory unit 200 from receiving the message. On the other hand if the memory 201 is not busy, the SEL BUSY signal will be inactive and the signal ABY will not be generated. This results in gate 208 not producing the signal ABYI, thereby enabling gate 209 to permit the trapping of the message from Bus A.

Still referring to FIG. 2C, the not busy output of gate 209 enables a latch control flip-flop 211 to be set on the next leading edge of the clock $\bar{\phi}A$ which occurs prior to the end of bus cycle 1. Switching of latch control flip-flop 211 latches the USE and UAD signals from Bus A into the USA and UAD latches 213 and 214. At the same time, the UBC decoder 210 is enabled by the not busy condition of SEL BUSY and the output of gate 205 to decode the UBC command and produce an RD signal which enables the read flip-flop 212. The trailing edge of the signal $\phi A$ which occurs at the end of bus cycle 1 switches flip-flop 212 to produce a memory read MRD signal. The MRD signal and the memory address from latch 214 are applied to the memory 201. The latch control flip-flop 211 and the read flip-flop 212 are then cleared on the next $\phi B$ clock so as to enable them to respond to an incoming message during bus cycle 2.

Also during bus cycle 1, a gate 310 included in user unit 300 responds to the not busy condition of the ABY signal (high level) to palce a high level at the K input of a URQ flip-flop 305. The other input to gate 310 is also high at this time as it is the output of inverter 316 which inverts the low level of the UBG signal. The next ensuing trailing edge of the $\bar{\phi}A$ clock then switches flip-flop 305 so as to remove the bus request signal URQ, $\bar{\phi}A$ being the complement of $\phi A$ and being produced by an inverter, not shown. On the other hand, if the ABY signal is low, signifying a busy condition, AND gate 310 does not enable the K input of flip-flop 305 such that it does not switch on the next occurring $\bar{\phi}A$ signal. The net effect is that the URQ bus request signal remains active into the next bus cycle, bus cycle 2. When bus cycle 1 comes to an end, the priority encoder 102 in the BCU 100 is free to grant bus usage to any user who has priority during the next bus cycle, bus cycle 2. If the memory unit was busy during bus cycle 1, the user 300 must compete with bus requests from other users to gain access to the bus during bus cycle 2. If the memory was not busy and did accept the message during bus cycle 1 the URQ bus request signal of unit 300, of course, is terminated.

During bus cycle 2 memory 201 performs a memory read operation. Also, during bus cycle 2, it is necessary to move the USE address to an auxiliary register 215 so as to allow latch 213 to receive new USE data. The USE data is transferred from latch 213 to USE auxiliary register 215 on the leading edge of the $\phi B$ signal in bus cycle 2. Also, memory 201 produces a MEM busy signal for the memory segment involved in the particular memory read operation. The MEM busy signal is applied to the comparator 224.

When the USE data is loaded into register 215 during bus cycle 2, the MRD signal is also loaded into one bit position thereof to serve as a look-ahead or anticipate for generation of a bus request MRQ for Bus B at the start of bus cycle 3. To this end, the MRD bit position output of register 215 is applied to the J input of the MRQ flip-flop 217. This enables flip-flop 217 to be switched on the next trailing edge of the $\phi A$ signal which occurs at the end of bus cycle 2. Switching of flip-flop 217 causes its $\bar{Q}$ output to drive Bus B with an MRQ signal as bus cycle 3 begins. The same $\phi A$ clocking signal is also used to load the USE address contained in auxiliary register 215 into another auxiliary USE register 216 at the end of bus cycle 2.

Near the end of bus cycle 2, memory 201 produces a READ DONE signal which operates an MDO latch 220 to latch the memory read data DOUT as soon as it becomes available.

Referring now to FIG. 2B, the BCU 100 includes another priority encoder 104 which prioritizes the MRQ signal with any other MRQ signals (including its internally generated BCMRQ signal) and grants bus usage according to a prewired priority scheme. The priority encoder 104 operates independently of priority encoder 102 and therefore is not hung up waiting for reply messages. Accordingly, encoder 104 can grant usage of Bus B for transmission of other reply messages while memory 200 is performing the road operation.

The output of the priority encoder 104 is decoded by an MDG decoder 105 to produce the MDG signal which is applied to Bus B. Assuming that the MRQ signal generated by the memory unit 200 is granted priority, decoder 105 places the MDG signal on the MDG lead which corresponds to the memory 200. This MDG signal is inverted in memory unit 200 by an inverter 222 to allow a coincidence gate 221 to pass the MDO data to Bus B and to further enable a gate 223 to pass the USE address from register 216 as the MUA address onto Bus B. The inverter MDG signal also enables a gate 219 to sample the MRD bit position of register 215 as inverted by an inverter 218. If this bit position is empty, signifying that register 215 is empty, gate 219 enables the K input of flip-flop 217 to switch on the next trailing edge of the $\phi A$ clock signal to thereby terminate the MRQ bus request. On the other hand, if the MRD bit position signifies that register 215 is full, the K input to flip-flop 217 is not enabled and the MRQ bus request remains active into the next bus cycle.

Bus controller 100 receives the MUA address from Bus B and decodes it in a decoder 107 to produce a UAS signal on the UAS signal lead associated with the sender of the original read memory message. The MUA signals are applied to the UAS decoder by way of a multiplexer or MUX 106. In the case where the bus grant was to the memory, the MUX 106 is in a condition to pass the MUA signals to the UAS decoder 107. For the case where the bus grant was to the BCU decoder 105 grants usage of the bus to the bus controller itself. The output of coincidence gate 108 places MUX 106 in condition to pass a BCU generated sender address BCUA through the decoder 107. The BCUA address is employed for a reply to a call interrupt message to be discussed later in conjunction with the call interrupt network 109.

At the end of bus cycle 3 as indicated in wave form diagram FIG. 3, the user 300 strobes the MDO data in coincidence with the φA clock. To this end, user unit 300 includes a coincidence gate 311 which responds to its address UAS as inverted by an inverter 318 on the trailing edge of the φ̄A clock to switch a flip-flop 312. The Q output of the flip-flop 312, the inverted UAS signal, and φ̄A are passed by another coincidence gate 319 to strobe or clock the MDO data from Bus B as inverted by an inverter 317 to the clock input of MDO register 313. The output of the MDO register 313 is applied to the user controller 301. After receipt of the MDO data, the user controller clears flip-flop 312 by means of a signal RPLYR. This places flip-flop 312 in condition to control the leading of new data into the MDO register 313. The user controller 301 is designed such that for read memory messages, RPLYR must always occur prior to the φA clock in the next bus cycle (bus cycle 4 in this example). This will prevent busy gate 314 from ever presenting a busy UBY signal to memory 200 when it is trying to send a reply message to the processor user's read memory message. To this end, gate 314 has one of its inputs connected to the Q output of flip-flop 312 and its other input connected to receive the UAS signal as inverted by inverter 318.

In summary, the processor user 300 sends a read memory message over Bus A to the memory during bus cycle 1. The memory, if not busy, accepts the message and returns a reply message containing the requested data over Bus B during a later bus cycle, cycle 3. The BCU bus grant networks are free to handle other message traffic over Bus A during the later bus cycle 3 as well as any intervening bus cycles.

As previously mentioned, another example of a message which requires the receiver to return a reply message to the sender is a call interrupt message. This message is sent by a processor user to the BCU to request the BCU to return previously posted interrupt information during a later bus cycle or cycles. The BCU 109 (FIG. 2B) includes a call interrupt network 109 illustrated in some detail in FIG. 4 for handling the receipt of a call interrupt message and the corresponding reply message. The call interrupt network 109 will now be described with the aid of the diagram of FIG. 5 which shows the wave forms of signals which occur at various points in FIG. 4.

Figure 5:
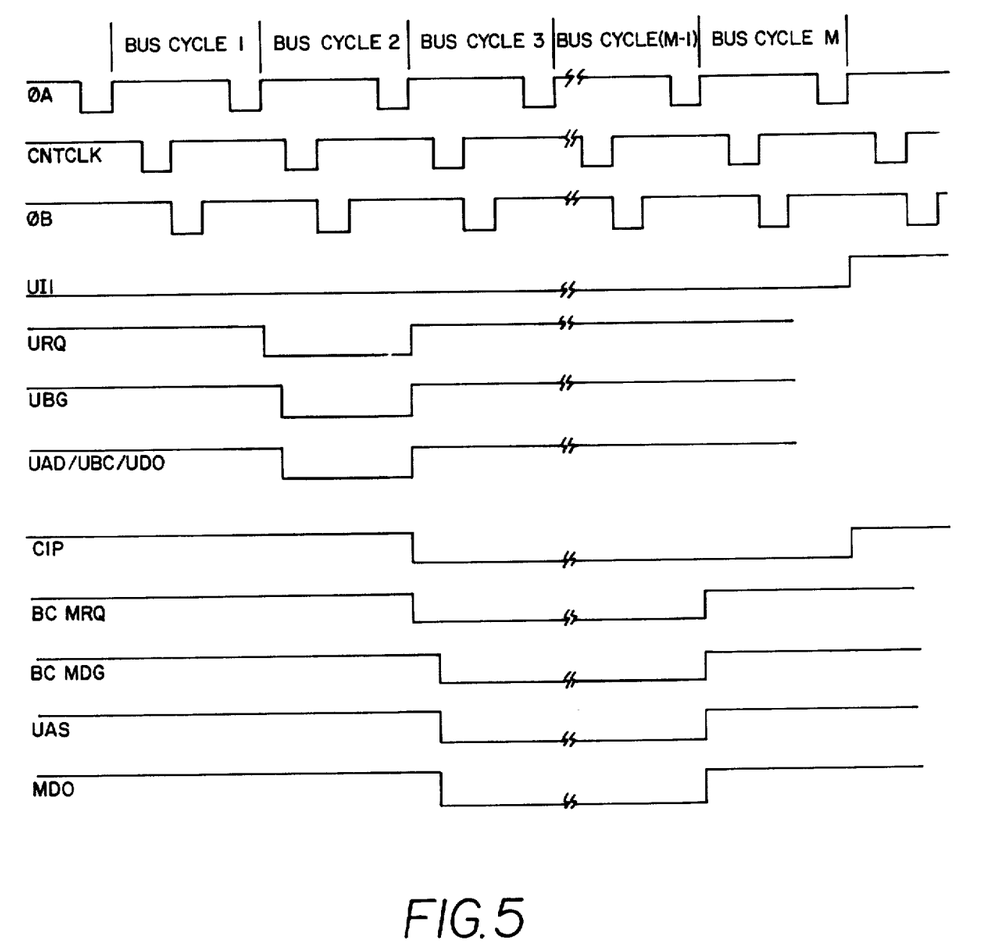
FIG. 5 is a wave form diagram of signal wave forms occurring at various points in the block diagram of FIG. 4.

With reference first to FIG. 5, the transmission of the call interrupt message and its corresponding reply message will be described as taking place during a number of bus cycles beginning with a bus cycle 1 an ending with bus cycle M. The wave form diagram has been broken between bus cycle 3 and bus cycle (M-1) to illustrate that there are intervening cycles. During a cycle previous to bus cycle 1, interrupt information is posted in the BCU 100. This interrupt information, for example, could be posted by an I/O channel 500 (FIG. 1) which requires service from one of the processors 300 or 400 system. The interrupt information is posted in the BCU by means of a message which in the exemplary design is called post interrupt. This is a message which is transmitted unidirectionally over Bus A from the sender to the BCU. When the interrupt information has been posted in the BCU, the BCU places on Bus A an interrupt pending signal UI1 which signals each processor in the system that it should send a call interrupt message to the BCU as soon as it becomes available. In the wave form diagram of FIG. 5 the UI1 signal becomes active in a bus cycle prior to bus cycle 1 and remains active until a call interrupt message has been transmitted over Bus A and the corresponding reply message returned over Bus B. In the illustrated design, the UI1 signal remains active until the end of bus cycle M.

Figure 4:
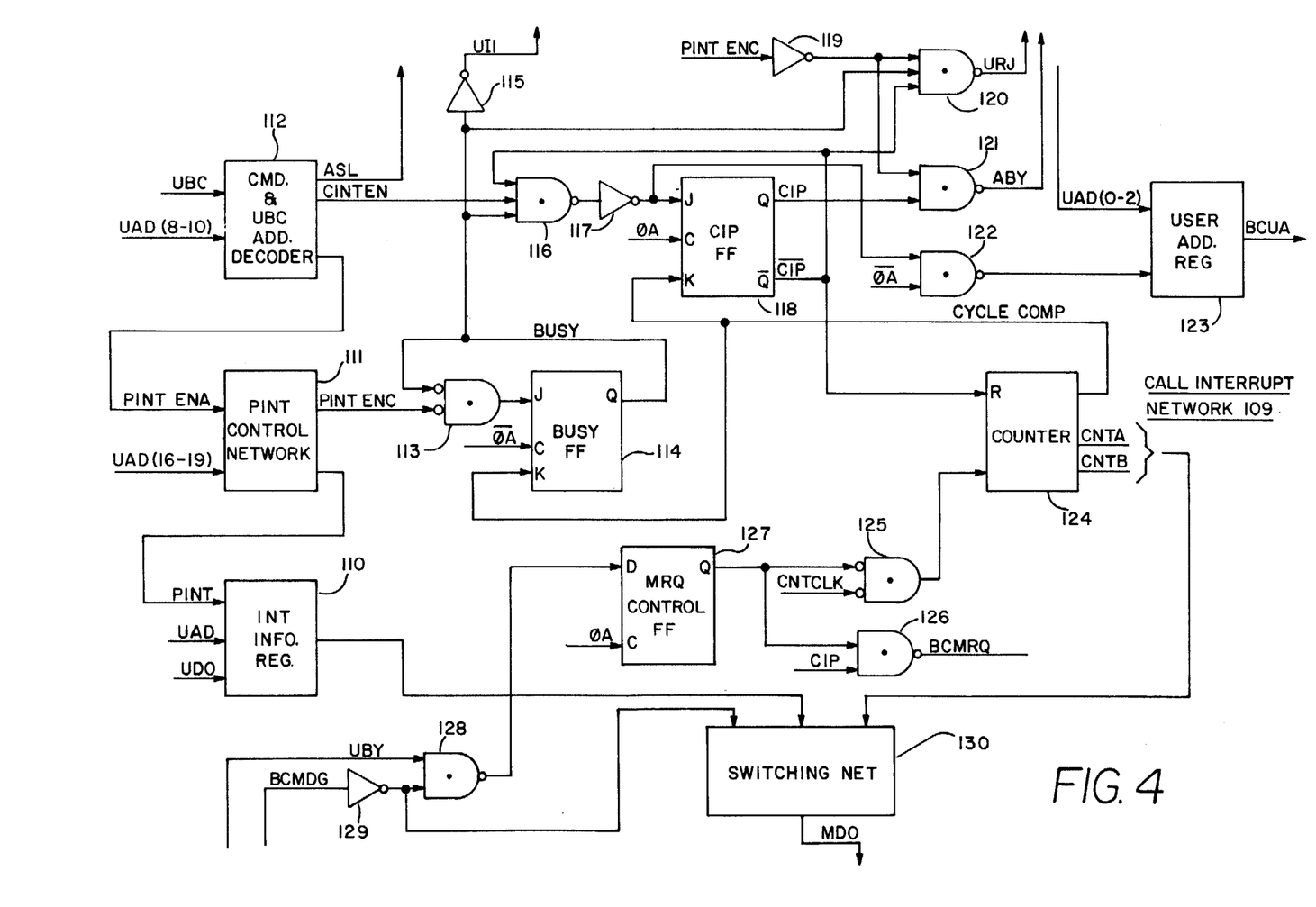
FIG. 4 is a block diagram of the call interrupt network included in the FIG. 2B diagram of the bus controller units.

With reference to FIG. 4 the call interrupt network 109 includes a command (message) and UBC address decoder 112 which receives the UBC signals and a portion of the UAD signals from Bus A. In the exemplary design, the decoder 112 examines bits 8 to 10 of the UAD signal to recognize that a message on Bus A is directed to the BCU. If the message is so directed, the decoder 112 enables itself to decode the UBC signals to determine the type of message. In addition, decoder 112 produces an ASL signal which is placed on Bus A to signal the sender that the message is being looked at. The decoder 112 has two other output signal leads CINT EN and PINT ENA which signify a call interrupt message and a post interrupt message, respectively. Thus, during the aforementioned prior bus cycle the PINT ENA signal enables a post interrupt (PINT) control network 111 to examine the UAD signals. In a post interrupt message, the UDO signals represent the status of the sender of the message bits 0 to 7 of the UAD signals represent the address of the sender and bits 16 to 19 of the UAD signals represent the interrupt vector. The network 111 may include various interrupt processing functions such as masking, testing for legal interrupt vector address and others. Assuming that the interrupt is proper, the network 111 produces two output signal PINT ENC and PINT. The PINT signal serves to load the UAD vector status and address information into the interrupt information register 110. The PINT ENC signal is applied to one input of a coincidence gate 113. The bubbles at the inputs to this gate signify that it produces a high signal at its output when both of the input signals are low. The other input to gate 113 is the Q output of a busy flip-flop 114 which in normal operation is set at the time an interrupt is posted and is reset after the interrupt information has been sent to a processor in response to a call interrupt message. Accordingly, if the Q output (also called BUSY signal) is low, the output of gate 113 enables the J input of the busy flip-flop 114 so that it will be set on the next occurring φA signal which is applied to its clock terminal. The connection of the busy signal to the input of gate 113 serves the purpose of preventing both the J and K inputs being high at the same time during the bus cycle in which the busy flip-flop is reset. The BUSY signal is inverted by an inverter 115 to place the UI1 signal on Bus A.

When a processor which, for the purpose of the present description is assumed to be processor 300 becomes available, it requests usage of Bus A to send a call interrupt message. The bus request and bus grant procedure is essentially identical to that described in the memory read operation and the URQ, UBG and UAD/UBC/UDO wave form representations as shown to occur during bus cycle 2 in FIG. 5. The decoder 112 (FIG. 4) decoder the UBC and UAD bits 8 to 10 of the signals from Bus A to produce at its output an active ASL signal for application of Bus A and an active call interrupt enable signal CINT EN. The CINT EN signal is used to set a call in progress (CIP) flip-flop 118 provided that an interrupt is pending and that an interrupt call message is not in process, meaning that the BCU has already accepted a call interrupt message from another processor and is in the process of servicing such request.

To this end, the CINT EN signal, the BUSY signal and the $\overline{\text{CIP}}$ signal output of CIP flip-flop 118 are applied as inputs to a coincidence gate 116. The output of gate 116 is inverted by an inverter 117 and applied as an enable to the J input of flip-flop 118.

For the case where an interrupt is pending and a call interrupt is not in progress and a user sends a post interrupt message, a coincidence gate 120 is arranged to place a user reject (URJ) signal on Bus A. To this end gate 120 has one of its inputs connected to the $\overline{\text{CIP}}$ output of flip-flop 118 which is in a reset condition at this time. The BUSY flip-flop Q output is applied to the second input and the PINT ENC post interrupt enable signal output network of 111 is applied to the other input of gate 120 by way of an inverter 119. Assuming that the CIP flip-flop has not already been set, the output of inverter 117 goes high to enable the J input of flip-flop 118 and to further enable one input of a coincidence gate 122. On the next occurring trailing edge of the clock signal (still in bus cycle 2) the $\overline{\phi A}$ clock signal is passed by gate 122 to load the user address register 123 with the UAD signals (bits 0-2) which identify the address of the sender of the call interrupt message namely, the processor unit 300 for this example. On the trailing edge of this clock signal (at the start of bus cycle 3) the flip-flop 118 switches and its CIP output now goes high. As depicted in the wave forms of FIG. 5, this occurs at the start of bus cycle 3.

A coincidence gate 121 is now enabled by the CIP signal to place an ABY busy signal on Bus A in the event that a user sends a post interrupt message while a call interrupt message is being processed. To this end gate 121 is connected to receive the output of inverter 119.

The CIP signal is also applied as an input to a coincidence gate 126 which is arranged to produce a BCMRQ (bus controller request) signal for usage of Bus B. The BCMRQ signal is processed by the priority encoder 104 (FIG. 2B). The other input of gate 126 is the Q output of an MRQ control flip-flop 127. Flip-flop 127 is arranged so that is Q output is high unless during the just previous bus cycle there was a bus grant for Bus B (BCMDG) to the BCU itself and also that the receiver of the message over Bus B was not busy (UBY at a high level). These conditions are monitored by a coincidence gate 128 which has one input connected to receive the UBY signal and the other input to receive the BCMDG signal via an inverter 129. The output of gate 128 is applied to the D input of flip-flop 127 which is clocked by the $\phi A$ signal.

Assuming the BCMRQ signal is produced by gate 126 and that the priority encoder 104 and MDG decoder 105 (FIG. 2B) do produce a BCMDG signal to grant usage of Bus B to the BCU, the call interrupt network 109 can begin to transmit the reply message to the processor user 300. To this end, the BCMDG signal as inverted by inverter 129 enables a switching network 130 to begin gating information contained in register 110 to Bus B. For the exemplary design the MDO leads of Bus B are able to take only a byte in one bus cycle (i.e., the number of leads equals the number of bits in a byte). This means that it will take several cycles to transmit a reply message having several bytes. Accordingly, the switching network 130 is controlled by two outputs CNTA and CNTB of a counter 127 so as to switch the bytes of register 110 onto Bus B in a byte serial manner. In addition, the byte serial transmission is further controlled so that a byte can be placed on Bus B only during every other bus cycle. To this end, the output of coincidence gate 128 goes low during each cycle that the bus grant signal BCMDG is active and the receiving unit is not busy, the causing the flip-flop 127 to switch on the $\phi A$ clock signal during that cycle. At the beginning of the next cycle the Q output of flip-flop 127 is low so as to inhibit the generation of a BCMRQ signal for that cycle. The resultant effect is that gate 126 produces a BCMRQ signal during alternate bus cycles (assuming the receiver is not busy). If the receiver is busy, the MRQ control flip-flop will remain in its set state and allow gate 126 to continue to present the BCMRQ signal into the next cycle.

The count of counter 127 is controlled by a coincidence gate 125 which is arranged to pass a count signal CNT CLK (wave form illustrated in FIG. 5) whenever the MRQ control flip-flop 127 is in a reset condition (Q output low). This occurs during during those alternate bus cycles when the BCMRQ signal is not produced by gate 126. This causes the counter 124 to change its output signal condition of CNTA and CNTB during such alternate nontransmission cycles so as to enable the switching network 130 to a gate a byte of data during the next transmission cycle. When all of the bytes have been gated on to Bus B, a further counter output signal CYCLE COMP enables the K inputs of the busy flip-flop 114 and the CIP flip-flop 118. On the next $\phi A$ signal (bus cycle M, for this example) these flip-flops are placed in their reset conditions, thereby allowing the posting of new interrupt information in the BCU.

The above described read memory and call interrupt message are two examples of messages which can be sent over one bus with a reply message being returned over another bus. The techniques, principles and mechanisms described for these two exemplary messages are certainly applicable to other messages which request the receiver to return a reply message at a later time.

What is claimed is:

1. In a computer system having a plurality of units interconnected by first and second common busses, said units communicating with one another by means of messages, at least one of such messages being a requesting message which includes a command requiring a reply message and the addresses of the sending and receiving units, the computer system comprising:

first, second, third and fourth ones of the units each including message transmitting means and message receiving means, the third and forth units further including means for processing the commands of such requesting messages and for providing a ready to return message signal upon the completion of such processing;

means for coupling the message transmitting means and message receiving means of the first and second units to the first and second busses, respectively, and the message transmitting and message receiving means of the third and fourth units to the second and first busses, respectively;

bus control means including
 first means for selectively enabling the message transmitting means of the first and second units to send messages including requesting messages over the first bus during first and second bus transfer intervals such that the message receiving means of the third and fourth units receive such requesting messages containing their respective receiving unit addresses; and second means operable in response to the ready to return message signals for selectively enabling the message transmitting means of the third and fourth units to return reply messages over the second bus during said first, second or other bus transfer intervals in accordance with the time sequence of such signals and in accordance with a priority schedule when two of such signals compete for the same bus transfer interval.

2. The invention as set forth in claim 1 wherein the third unit includes means to save a portion of a first message received by its message receiving means and to cause its message transmitting means to send such portion as a reply message in response to a later received requesting message.

3. The invention as set forth in claim 1 which is further characterized by a clock means which distributes clock signals defining the bus transfer intervals via one of the busses, by the first and second means operating independently of one another and by all of the message transmitting means operating in synchronism with the clock signals.

4. In a computer system as set forth in claim 3 which is further characterized by each of the processing means including means to transmit its ready to return message signal as a bus request signal over the second bus and by the second means responding to any such signals active at the start of a bus transfer interval to grant usage of the second bus for such interval in accordance with a priority scheme.

5. In a computer system as set forth in claim 4 which is further characterized by (said other units including) the third and fourth units being a memory unit and a bus control unit which includes the bus control means and the clock means.

6. The invention as set forth in claim 5 which is further characterized by (each of the original messages including the identity of the sender and by said reply) message transmitting means of the memory unit and the bus control unit including means to include the sender's (identity) address in the reply message.

7. The invention as set forth in claim 6 which is characterized by a first message being transmitted to the bus control unit and by the message transmitting means included in the bus control unit having means to save at least a portion of such message and to return such portion as a reply message to a second requesting message.

8. The invention as set forth in claims 3, 4, 5, 6 or 7 which are further characterized by the clock signal period defining a singal bus transfer cycle and a bus transfer interval including one or more such cycles and by one of the message transmitting means including means to transmit an associated message during a number of such cycles serial by byte.

* * * * *